US005461370A

United States Patent [19]

Igarashi et al.

[11] Patent Number: 5,461,370

[45] Date of Patent: Oct. 24, 1995

[54] FIRE ALARM SYSTEM

[75] Inventors: Akira Igarashi; Takashi Kobayashi; Akio Tsumuji, all of Tokyo, Japan

[73] Assignee: Nohmi Bosai, Ltd., Tokyo, Japan

[21] Appl. No.: 129,082

[22] PCT Filed: Feb. 2, 1993

[86] PCT No.: PCT/JP93/00123

§ 371 Date: Oct. 4, 1993

§ 102(e) Date: Oct. 4, 1993

[87] PCT Pub. No.: WO93/15577

PCT Pub. Date: Aug. 5, 1993

[30] Foreign Application Priority Data

Feb. 4, 1992 [JP] Japan .................................... 4-019177

[51] Int. Cl.$^6$ ...................................................... H04L 11/16

[52] U.S. Cl. ............................ 340/825.05; 340/825.160; 370/15; 370/16.1; 370/85.12

[58] Field of Search ........................ 340/825.05, 825.16, 340/825.36, 508; 370/15, 16.1, 85.12, 85.15; 371/11.1, 11.2, 20.5, 20.6

[56] References Cited

U.S. PATENT DOCUMENTS

| | | | |
|---|---|---|---|
| 4,446,551 | 5/1984 | Seo | 340/825.05 |
| 4,542,496 | 9/1985 | Takeyama et al. | 340/825.05 |
| 4,704,714 | 11/1987 | Tomizawa et al. | 370/15 |
| 4,973,953 | 11/1990 | Shimokawa et al. | 370/85.12 |

FOREIGN PATENT DOCUMENTS

| | | |
|---|---|---|
| 0102222 | 3/1984 | European Pat. Off. . |
| 0279864 | 8/1988 | European Pat. Off. . |
| 0395483 | 10/1990 | European Pat. Off. . |
| 58-201440 | 11/1983 | Japan . |
| 59-23650 | 2/1984 | Japan . |
| 62-159939 | 7/1987 | Japan . |
| 62-221236 | 9/1987 | Japan . |
| 2202713 | 9/1988 | United Kingdom . |

*Primary Examiner*—Michael Horabik
*Attorney, Agent, or Firm*—Wenderoth, Lind & Ponack

[57] ABSTRACT

In a fire alarm system one of a fire receiver and terminal devices transmits the same signals in opposite transmission directions to first and second loop-signal lines. The remaining ones of the fire receiver and terminal devices receive the signals transmitted through the first and second loop-signal lines and detect whether there is an abnormality in transmission by detecting differences in the receiving times of the signals. Consequently, an abnormality of transmission is detected immediately. A fire receiver or terminal device which detects any abnormality immediately causes the first and second loop-signal lines connected with each other to form a signal loop-back path, thereby transmitting signals to the entire loop-signal line except to the position where the abnormality occurs. As a result, the reliability of signal transmission is significantly improved.

6 Claims, 5 Drawing Sheets

FIRE ALARM SYSTEM

TECHNICAL FIELD

The present invention relates to a fire alarm system in which fire receivers, transmitters (monitoring transmitters to which fire detectors are connected, control transmitters to which devices to be controlled such as fire doors are connected, monitoring/control transmitters), and a plurality of terminal devices such as analog type fire detectors and addressable fire detectors are connected by means of loop-signal lines.

BACKGROUND ART

A fire alarm system using loop-signal lines has been well known. In this type of fire alarm system, fire receivers are connected with a plurality of terminal devices through loop-type signal lines. Thus, even if an abnormality such as a disconnection or a short-circuit occurs halfway along the signal line, this system is capable of controlling devices such as fire doors at the time of fire monitoring or during a fire because each terminal device is connected to a fire receiver through a signal line beyond a position where the abnormality occurs.

In such a conventional fire alarm system, signals can be transmitted between the fire receiver and the terminal devices by making polling signals flow to the loop-signal line unidirectionally at a normal operating time. When any terminal device does not respond, the conventional system determines that terminal devices located after the non-responding terminal device cannot be polled due to a disconnection or a short-circuit, and calls the non-responding terminal device by supplying a polling signal to the loop-signal line in the opposite direction. Consequently, an abnormality generated in the loop-signal line and the generating position are detected.

However, this conventional system takes a long time to detect an abnormality, because, when any terminal device does not respond to a unidirectional polling, the device must be polled in the opposite direction to detect an abnormality in the loop-signal line and the position where the abnormality occurs.

An object of the present invention is to provide a fire alarm system which is capable of detecting an abnormality immediately when an abnormality such as a disconnection occurs in the loop-signal line.

DISCLOSURE OF INVENTION

According to the present invention, there is provided a fire alarm system having a fire receiver to which a plurality of terminal devices are connected through loop-signal lines, the fire alarm system comprising; a first loop-signal line for connecting the fire receiver and a plurality of the terminal devices in the form of a loop and transmitting signals to the loop in a specified direction; and a second loop-signal line for connecting the fire receiver and a plurality of the terminal devices in the form of a loop and transmitting signals in an opposite direction relative to the first loop-signal line. Each of the fire receiver and the terminal devices include; a signal transmitting means for transmitting signals to the first and second loop-signal lines at the same time; a first signal receiving means for receiving signals input from the first loop-signal line; a second signal receiving means for receiving signals input from the second loop-signal line; and a reception determining means for determining whether a difference in signal receiving time between the receiving of signals by the first signal receiving means and the receiving of signals by the second signal receiving means is within a specified interval of time.

In the fire alarm system configured as described above, the fire receiver or terminal device transmits the same signals from its own signal transmitting means to the first and second loop-signal lines in opposite directions at the same time, and the other fire receiver or terminal devices receive a signal transmitted through the first and second loop-signal lines by means of the first and second signal receiving means in order to detect a difference in signal receiving time, thereby detecting an abnormality of transmission, for example, whether there is a disconnection or a short-circuit in the first loop-signal line or the second loop-signal line. Thus, the system according to the present invention is able to detect an abnormality in the loop-signal lines immediately.

BEST MODE FOR CARRYING OUT THE INVENTION

Figure 1:
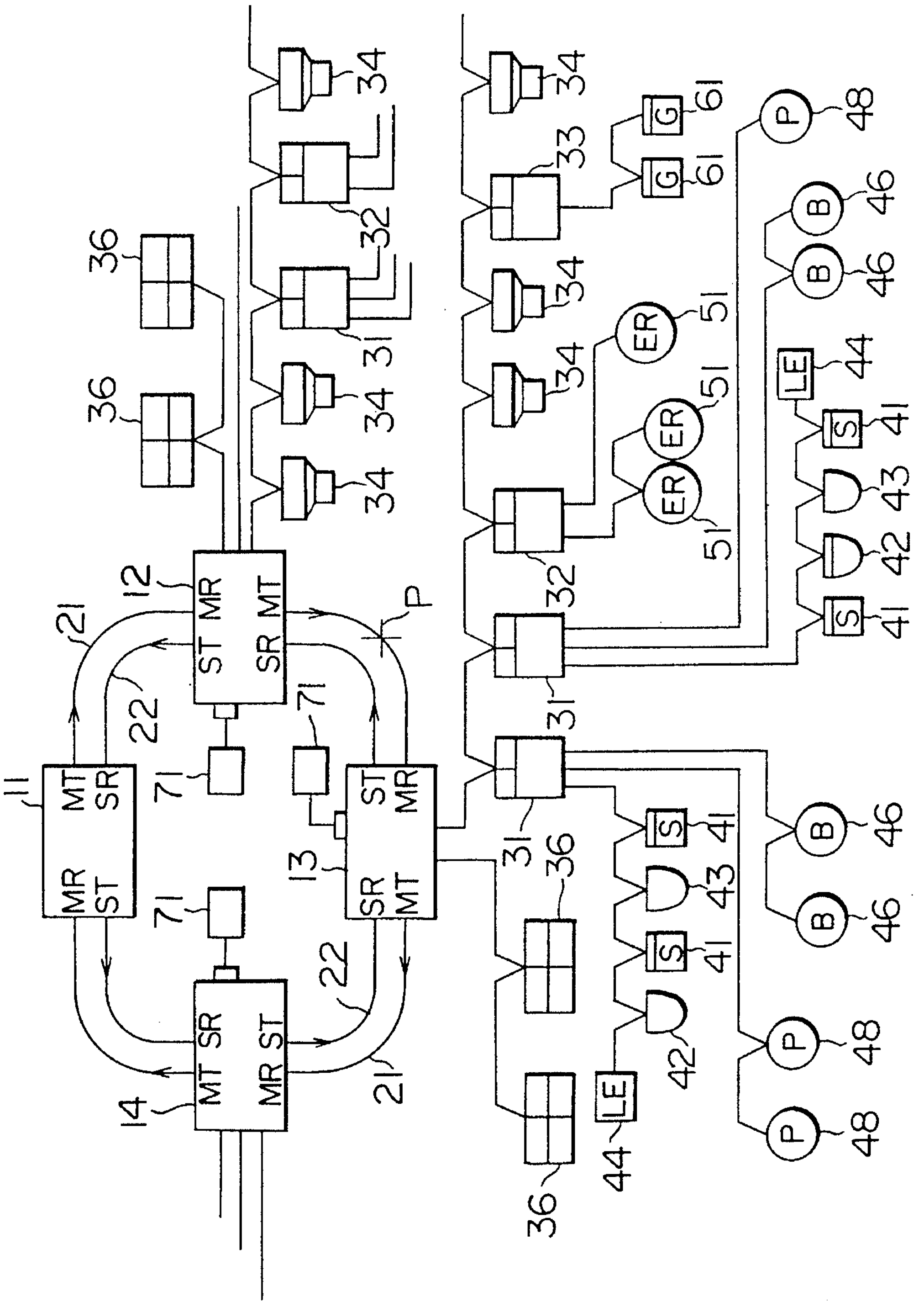
FIG. 1 is a block diagram showing a fire alarm system according to an embodiment of the present invention.

FIG. 1 shows the configuration of a fire alarm system according to an embodiment of the present invention. Sub-receivers 12–14 which each serve as a major transmitter are connected to a central receiver 11. The central receiver 11 and the sub-receivers 12–14 are connected to each other in the form of a loop by two systems of signal lines including main loop-signal lines 21 which transmit a signal in one direction and sub-loop-signal lines 22 which transmit a signal in the other direction. Each sub-receiver 12–14 is connected to various detectors and devices to be controlled through ordinary transmitters. In an example of the system illustrated in FIG. 1, monitoring transmitters 31, control transmitters 32, gas leakage transmitters 33, analog fire detectors of photoelectric, ionization or thermal type 34, display devices 36, ordinary smoke detectors 41, rate-of-rise detectors 42, fixed-temperature detectors 43, end-of-line devices 44, local alarm sounding devices 46 such as bells, manual fire alarm call points 48, devices to be controlled 51 such as the closing device of a fire door or the releasing device of a smoke damper and gas leakage detectors 61 are connected to the sub-receivers. A display/control device 71 is attachable to each sub-receiver 12–14. By connecting the display/control device 71 to each sub-receiving device 12–14, the command which is essentially sent from the central receiver 11 may be sent through the sub-receiver 12–14 and the data which is essentially displayed on the central receiver 11 may be displayed on the display/control device 71 through the sub-receiver 12–14.

Polling signals, return signals and other various kinds of signals are communicated through the main loop-signal line 21 between the central receiver 11 and each sub-receiver 12–14, and mutually between the sub-receivers 12–14. At the same time, the same signals as in the main loop-signal line 21 are transmitted through the sub-loop-signal line 22. Thus, the central receiver 11 and the sub-receiving devices 12–4 may receive the same signals both from the main loop-signal line 21 and the sub-loop-signal line 22. However, when signals sent from the main loop-signal line 21 are present, only the signals received from the main loop-signal line 21 are input into an internal signal processing circuit, not shown, having a micro-computer When a signal from the main loop-signal line 21 does not exist due to an abnormality such as disconnection, signals received through the sub-loop-signal line 22 are input into the internal signal processing circuit.

Usually, the configuration described above enables the sub-receivers 12–14 to fetch signals from the various detectors according to polling signals transmitted from the central receiver 11 through the main loop-signal line 21 to process the signals for monitoring whether a fire occurs and to transmit the result to the central receiver 11. When the occurrence of a fire is detected, the sub-receivers 12–14 control the operation of a device to be controlled such as a fire door according to a command from the central receiver 11.

Figure 2:
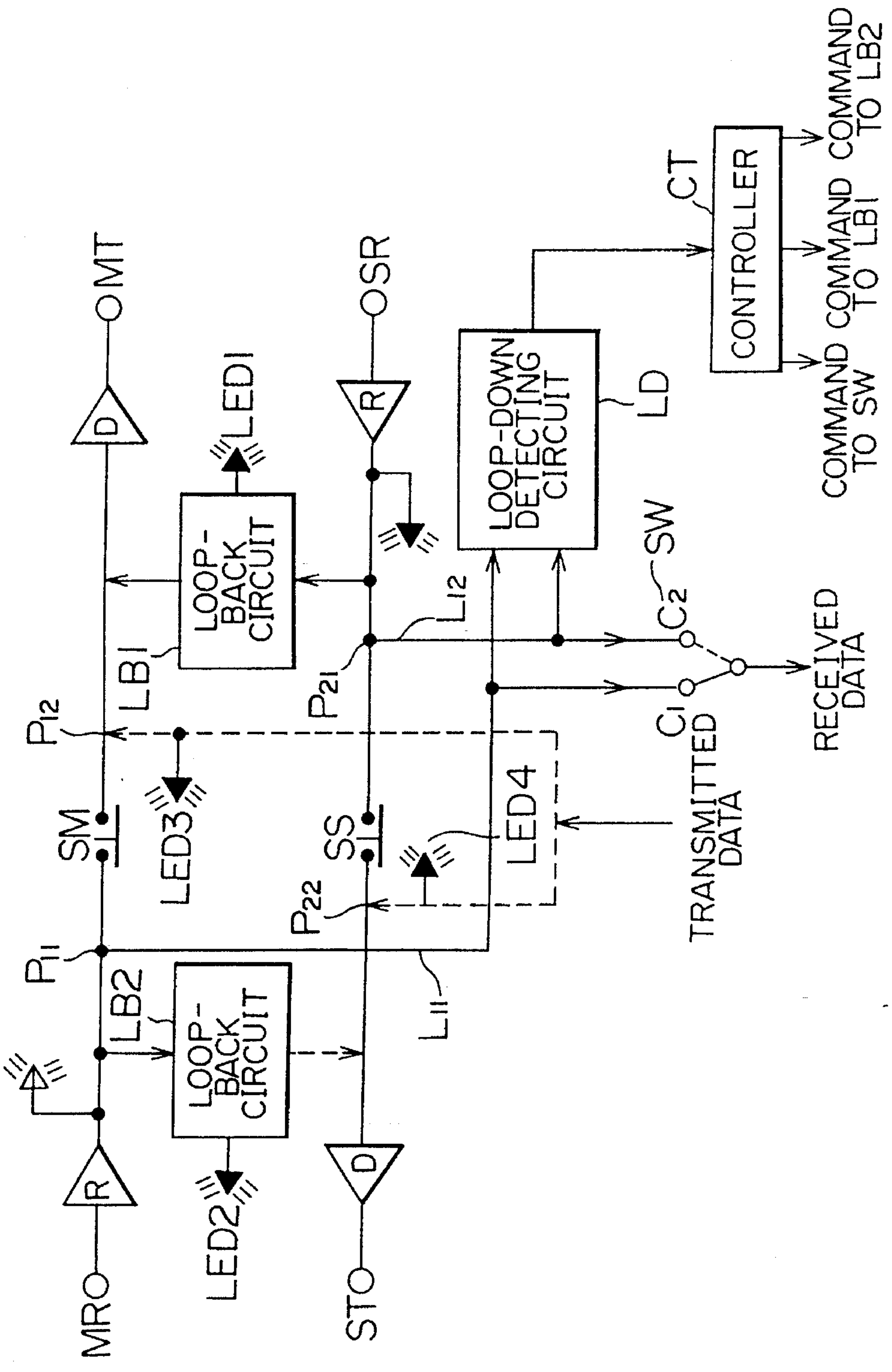
FIG. 2 is a block diagram showing the configuration of a signal transmitting section which is provided in the central receiver and in each terminal device.

The central receiver 11 and the sub-receivers 12–14 contain a signal transmitting section as shown in FIG. 2 as well as the signal processing circuit described above, each internally. The signal transmitting section will be described below. A signal on the main loop-signal line 21 is received by a receiver R through a main loop receiving terminal MR. The received signal passes a repeater SM and is returned to the main loop-signal line 21 from a driver D through a main loop transmitting terminal MT, and simultaneously passes a point P11, a path L11 and a contact point C1 of a received signal selecting circuit SW and is input into the signal processing circuit (not shown) inside the central receiver 11 and the sub-receivers 12–14 for signal processing. Usually, the received signal selecting circuit SW selects the contact point C1 so as to input signals from the main loop-signal line 21, and when no signal is received due to an abnormality such as disconnection which occurs in the main loop-signal line 21, the received signal selecting circuit SW selects the contact point C2 instead of the contact point C1.

Likewise, a signal on the sub-loop-signal line 22 is received by a receiver R through a sub-loop receiving terminal SR, passes a repeater SS and is returned to the-sub-loop-signal line 22 from a driver D through a sub-loop transmitting terminal ST. When no signal from the main loop-signal line 21 is received due to an abnormality such as a disconnection which occurs in the main loop-signal line 21, a signal received by the receiver R passes a point P21, a path L12 and a contact point C2 of the received signal selecting circuit SW and is input into the signal processing circuit inside the sub-receiving devices 12–14.

When data is transmitted from the central receiver 11 or the sub-receivers 12–14, after the repeaters SM and SS are opened, transmission signals are sent to the main loop-signal line 21 from the signal processing circuit through the point and simultaneously the same signals are transmitted to the sub-loop-signal line 22 through the point P22. When data is transmitted, by opening the repeaters, data flows on the main loop-signal line 21 and the sub-loop-signal line 22 become constant, namely from the left to the right in FIG. 2 on the main loop-signal line 21 and from the right to the left on the sub-loop-signal line 22. When data is being transmitted, the display lamps LED 3 and 4 are lit indicating that data is being transmitted.

A first loop-back circuit LB1 and a second loop-back circuit LB2 are connected between the main loop-signal line 21 and the sub-loop-signal line 22 in the signal transmitting section. The first loop-back circuit LB1 connects the sub-loop-signal line 22 to the main loop-signal line 21 when no signal is transmitted to the main loop-signal line 21 because a problem such as a disconnection occurs upstream of the main loop-signal line 21 or a sub-receiver located upstream has a problem. As a result, a signal which is transmitted through the sub-loop-signal line 22 is transmitted downstream of the main loop-signal line 21. The second loop-back circuit LB2 connects the main loop-signal line 21 to the sub-loop-signal line 22 when no signal is transmitted to the sub-loop-signal line because a problem such as a disconnection occurs upstream of the sub-loop-signal line 22 or a sub-receiver located upstream has a problem. As a result, a signal which is transmitted through the main loop-signal line 21 is transmitted downstream of the sub-loop-signal line 22.

When no signal is transmitted to the main loop-signal line 21 or the sub-loop-signal line 22 because the loop line is cut or the sub-receiver has a problem, the loop-down detecting circuit LD detects such an abnormality and outputs a detecting signal to the controller CT. For example, when the loop-down detecting circuit LD detects that no signal from the main loop-signal line 21 has been sent to the main loop receiving terminal MR, the controller CT makes the received signal selecting circuit SW select the contact point C2 in order to receive a signal from the sub-loop-signal line 22 and turns on the first loop-back circuit LB1, connecting the main loop-signal line 21 with the sub-loop-signal line 22. Consequently, the signal transmitted through the sub-loop-signal line 22 is transmitted downstream of the main loop-signal line 21 through the first loop-back circuit LB1 and the main loop transmitting terminal MT. Accordingly, the sub receiving devices located downstream of the main loop-signal line 21 are capable of receiving the signal through the main loop-signal line 21 as usual. At this time, the display lamp LED1 goes on indicating that the first loop-back circuit LB1 has connected the signal line 21 with the signal line 22. On the other hand, the signal which flows from upstream of the sub-loop-signal line 22 flows downstream of the sub-loop-signal line 22 regardless of the operation of the first loop-back circuit LB1.

When the loop-down detecting circuit LD detects that a signal has been received again through the main loop-signal line 21, the controller CT makes the received signal selecting circuit SW select the contact point C1 in order to receive the signal from the main loop-signal line 21, and simultaneously turns off the first loop-back circuit LB1, disconnecting the signal line 21 from the signal line 22. Consequently, the signal transmitting section is restored to its normal state. The microcomputer in the signal processing section may serve as the controller CT.

Conversely, when no signal flowing in the sub-loop-signal line 22 is transmitted to the sub-loop receiving terminal SR, the controller CT turns on the second loop-back circuit LB2, connecting the main loop-signal line 21 with the sub-loop-signal line 22. Consequently, the signal transmitted through the main loop-signal line 21 is transmitted downstream of the sub-loop-signal line 22 through the second loop-back circuit LB2 and the sub-loop transmitting terminal ST. Thus, the sub-receivers located downstream of the sub-loop-signal line 22 may receive signals through the sub-loop-signal line 22 as usual. At this time, the display lamp LED2 goes on, indicating that the second loop-back circuit LB2 has connected the signal line 21 with the signal line 22. On the other hand, signals flowing from upstream of the main loop-signal line 21 flow downstream of the main loop-signal line 21 regardless of the operation of the second loop-back circuit LB2.

When the loop-down detecting circuit LD detects that signals have been received again through the sub-loop-signal line 22, the controller CT turns off the second loop-back circuit LB2 to disconnect the signal line 21 from the signal line 22. As a result, the signal transmitting section is restored to its normal state.

The signal transmitting section as described above is provided in each sub-receiver 12–14 and the central receiver 11, thus the entire loop shown in FIG. 1 operates as follows. Assume that an abnormality such as a disconnection or other problem occurs in the main loop-signal line 21 or the sub-loop-signal line 22, for example, that a disconnection occurs at the point P on the main loop-signal line 21 shown in FIG. 1 when the central receiver 11 is transmitting signals. First, the loop-down detecting circuit LDs in all the sub-receivers located downstream of the main loop-signal line 21, namely the sub-receiving devices 13 and 14, detect the disconnection and the loop-back circuit LB1 in the sub-receivers 13 and 14 are turned on to connect the signal line 21 with the signal line 22. However, when signals from the sub-loop-signal line 22 are made to flow to the main loop-signal line 21 by the operation of the first loop-back circuit LB1 in the sub-receiver 13 nearest the point P where the disconnection occurs, the sub-receiver 14 located downstream of the sub-receiver 13 is enabled to receive the signal on the main loop-signal line 21, so that the first loop-back circuit LB1 is automatically turned off, shutting down the connection between the signal lines 21 and 22 in the sub-receiving device 14.

Figure 3:
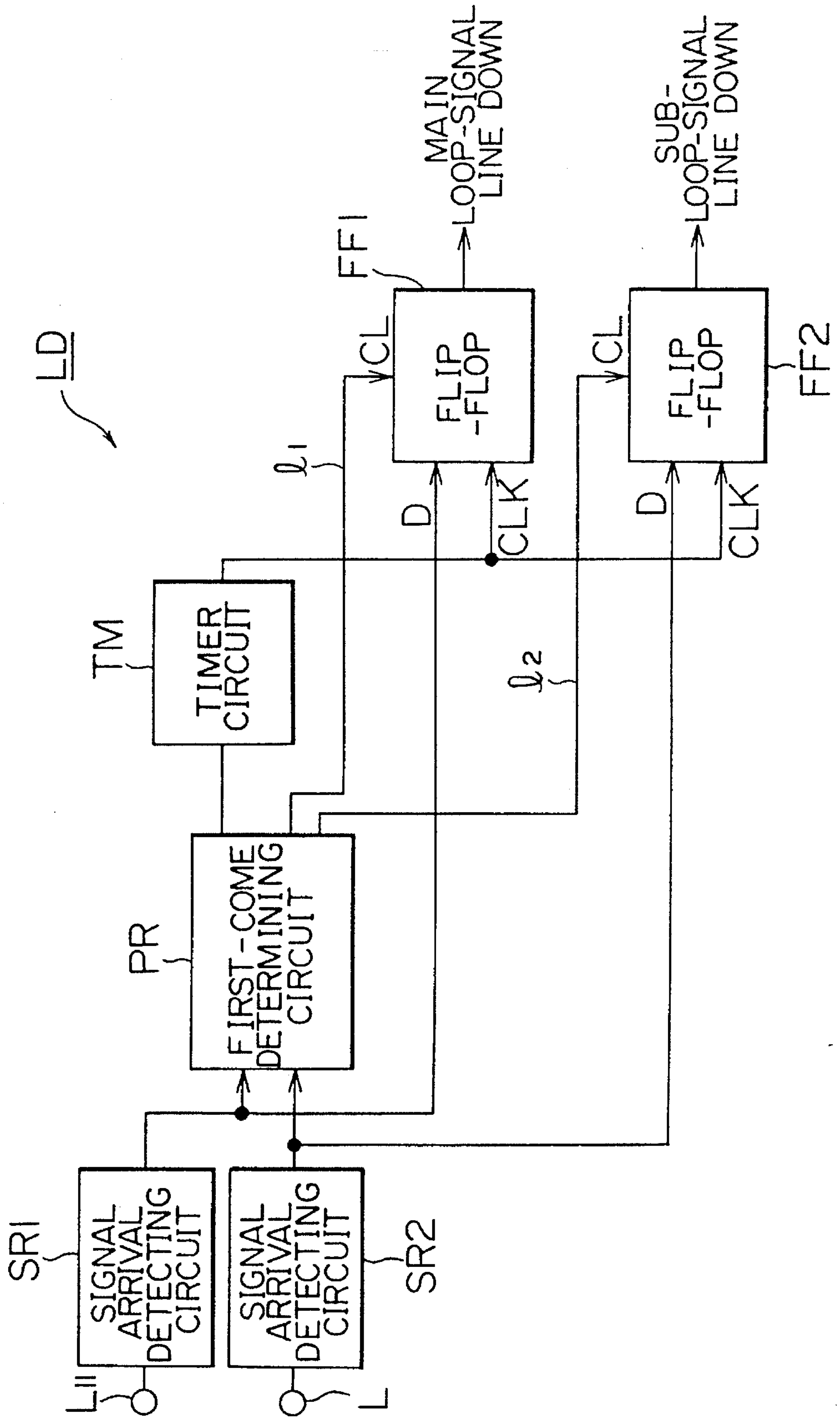
FIG. 3 is a block diagram showing the configuration of a loop-down detecting circuit which is used in the signal transmitting section shown in FIG. 2.

At this time, signals on the main loop-signal line 21 flow from the central receiver 11 up to the point P through the sub-receiver 12 and the signals which are supplied from the sub-loop-signal line 22 to the main loop-signal line 21 through the first loop-back circuit LB1 in the sub-receiver 13 flow from the sub-receiver 13 to the sub-receiver 14. Namely, signals flow through all the sections of the main loop-signal line 21 excluding the portion between the point P and the sub-receiver 13. On the other hand, the sub-loop-signal line 22 allows signal flow through a completely closed loop. Namely, not only when no abnormality occurs, but also when an abnormality occurs, the same signals flow through all the sections of both the main loop-signal line and the sub-loop-signal line except for the portion where the abnormality occurs. For this reason, this loop transmission system has very high reliability, FIG. 3 shows the details of the loop-down detecting circuit LD shown in FIG. 2. The loop-down detecting circuit LD determines which of the main loop-signal line 21 or the sub-loop-signal line 22 undergoes an abnormality when no signal is transmitted due to an abnormality such as a disconnection and outputs the result to the controller CT. Because the same signals are always flowing on both the main loop-signal line 21 and the sub-loop-signal line 22, if no signal reaches one loop-signal line within a specified time after the signal on the other loop-signal line is detected, the loop-down detecting circuit LD determines that there has occurred an abnormality such as a disconnection in the one loop-signal line.

Figure 4:
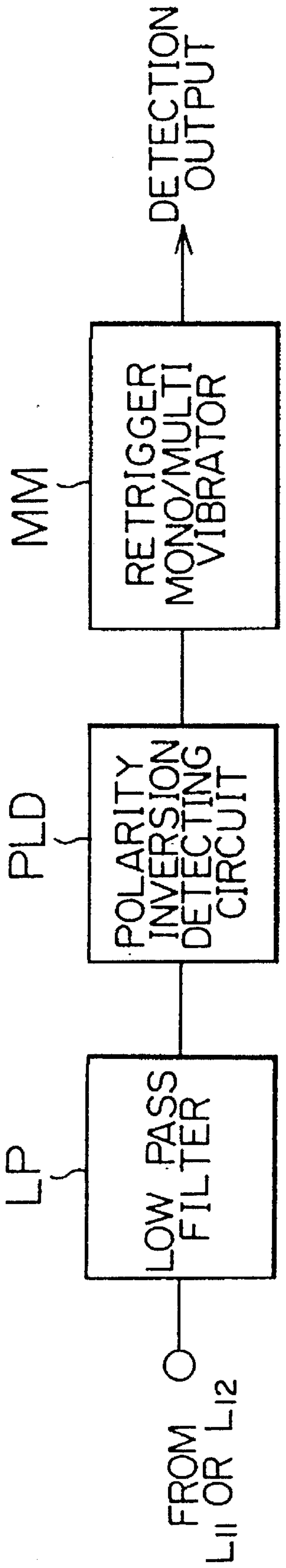
FIG. 4 is a block diagram showing the configuration of the signal arrival detecting circuit which is used in the loop-down detecting circuit shown in FIG. 3.

FIG. 4 shows the internal configuration of the signal arrival detecting circuits SR1 and SR2 which are used in the loop-down detecting circuit LD. Received signals from the main loop-signal line 21 or the sub-loop-signal line 22 first pass a low pass filter LP to absorb noises mixed in the received signals and then are transmitted to a polarity inversion detecting circuit PLD. The polarity inversion detecting circuit PLD comprises a rise/fall detecting circuit formed of, for example, a flip-flop. In this embodiment, the High-level Data Link Control (HDCL) method is used for signal transmission and the signal sign uses the No-return-to-Zero-Invert (NRZI) method. Assuming that the transmission rate is 1 Mbit/second, the signal sign always undergoes an inversion of polarity once every 1 μsecond through 7 μseconds. Thus, it is possible to detect whether signals are flowing through the loop by catching an inversion of a received signal sign, which occurs once every 7 μseconds or less.

A retrigger mono-multi vibrator MM drives an internal counter circuit using a 16 MHz clock and is actuated by retriggering the counter circuit by the output from the polarity inversion detecting circuit PLD. While the counter circuit is retriggered before the counted value exceeds its setting value, the retrigger mono-multi vibrator MM outputs a low-level signal, and when the counted value exceeds the setting value, the retrigger mono-multi vibrator MM outputs a high-level signal. The setting value of the counter circuit is set to, for example, 7,750 μseconds. Namely, the retrigger mono-multi vibrator MM outputs a low-level signal because the counter circuit is retriggered as long as there is a polarity inversion detecting signal transmitted from the polarity inversion detecting circuit PLD. The low-level output indicates that the transmission signal exists on the main loop-signal line 21 or the sub-loop-signal line 22. When the setting value of 7.750 μseconds is exceeded without retriggering the counter circuit because no transmission signal exists on the loop, the retrigger mono-multi vibrator MM outputs a high-level signal. The high-level output is supplied to the first-come determining circuit PR and the flip-flop FF1 or FF2 shown in FIG. 3 and output from the flip-flop FF1 or FF2 as the loop-down signal of the main loop-signal line 21 or the sub-loop-signal line 22 depending on the output of a timer circuit TM.

The first-come determining circuit PR is connected to paths L11 and L12 shown in FIG. 2 through the signal arrival detecting circuits SR1 and SR2, and determines which of the main loop-signal line 21 or the sub-loop-signal line 22 a received signal has reached. When the received signal reaches either the main loop-signal line 21 or the sub-loop-signal line 22, the timer circuit TM is activated by the first-come determining circuit PR, and the timer circuit TM supplies a signal to the first and second D-type flip-flops FF1 and FF2 after a specified time, namely after the time constant of the timer circuit TM elapses. The first and second flip-flops FF1 and FF2 are capable of outputting signals from the signal arrival detecting circuits SR1 and SR2, respectively, if no reset signals are input therein through signal lines 11 and 12. The signal arrival detecting circuits SR1 and SR2 determine whether a transmission signal is flowing on the main loop-signal line 21 and the sub-loop-signal line 22, respectively, as described above, and output high-level signals when no signal is present on the main loop-signal line 21 and the sub-loop-signal line 22, and output low-level signals when a signal arrives thereat.

For example, when a received signal reaches the main loop-signal line 21 ahead of the sub-loop-signal line 22, the timer circuit TM is activated and simultaneously a reset signal is supplied to the first flip-flop FF1 for the main loop-signal line 21 through the signal path 11 to prevent the first flip-flop FF1 from outputting. After the specified time, namely after the time constant of the timer circuit TM elapses, the second flip-flop FF2 for the sub-loop-signal line 22 receives the signal from the timer circuit TM and accordingly outputs the signal input from the signal arrival detecting circuit SR2. Thus, unless the signal arrival detecting circuit SR2 is changed so as to output a low-level signal due to the arrival of a signal on the sub-loop-signal line 22 by the time a signal from the timer circuit TM is received, the second flip-flop FF2 outputs the high-level signal indicating that there is an abnormality such as disconnection upstream of the sub-loop-signal line 22.

If no signal arrives at one loop-signal line within a specified time after detecting a signal on the other loop-signal line, the loop-down detecting circuit LD determines that an abnormality has occurred in the one loop-signal line as described above. However, because the central receiver 11 calls each sub-receiver 12–14 successively by polling, the sub-receiver which transmits a signal changes cyclically. For this reason, the arrival order of the signals on the main loop-signal line 21 and the sub-loop-signal line 22 normally reverses and then returns to the original order while the sub-receivers which transmit a signal make a round. As a result, the main loop-signal line 21 and the sub-loop-signal line 22 are assured to be always checked while the sub-receivers which transmit a signal make a round.

Figure 5:
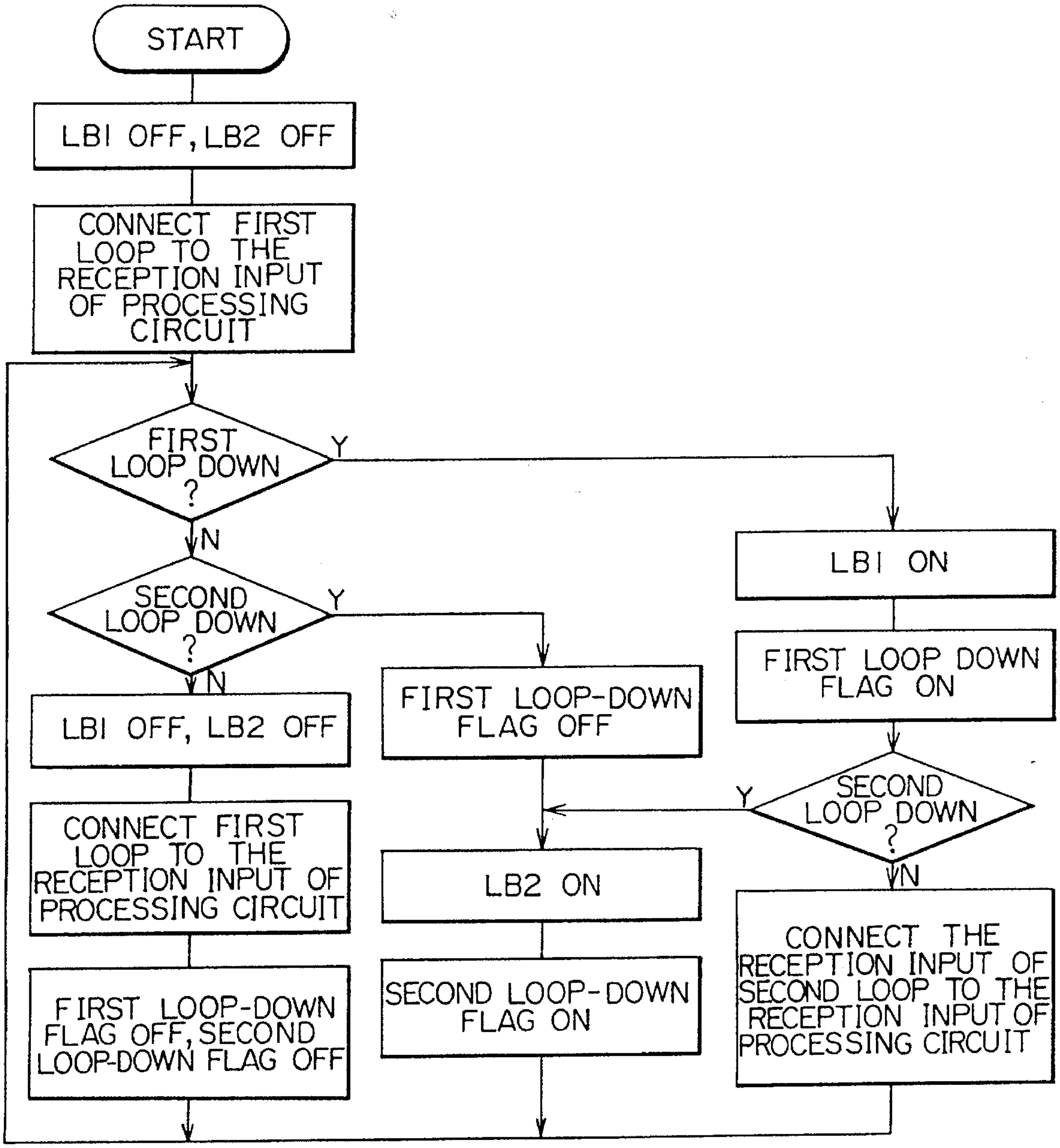
FIG. 5 is a flow chart explaining the operation of the controller which is used in the signal transmitting section shown in FIG. 2.

FIG. 5 shows a flow chart of the operation of the controller CT based on the detecting signals from the loop-down detecting circuit LD. The controller CT indicates the on/off state of the first loop-back circuit LB1 and the second loop-back circuit LB2 by means of a first loop-down flag and a second loop-down flag. A signal indicating that the first loop-back circuit LB1 is on by turning on the first loop-down flag and a signal indicating that the second loop-back circuit LB2 is on by turning on the second loop-down flag are transmitted to the main loop signal line 21 and the sub-loop-signal line 22 by the unillustrated signal processing circuit. This enables other sub-receivers or the central receiver to recognize in which sub-receiver a loop-back circuit is formed.

The embodiment described above shows a case in which the central receiver 11 and the sub-receivers 12–14 are connected in the form of a loop. Additionally, it is permissible to make a loop connection between a sub-receiver and an ordinary transmitter (for monitoring and controlling) to be connected to the sub-receiver, or between a sub-receiver and a terminal device such as an analog type fire detector and addressable fire detector. Further, it is possible to connect the central receiver with a terminal device, such as an ordinary transmitter and fire detector, directly in the form of a loop without providing any major transmitter, that is, any sub-receiving device.

According to the present invention, a fire receiver or a terminal device transmits signals to the first and second loop-signal lines having opposite signal transmission directions at the same time, and other fire receivers or terminal devices receive signals transmitted through the first and second loop-signal lines, respectively, to detect a difference of receiving time, thereby detecting whether there is any abnormality of transmission. Thus, the system according to the present invention is capable of immediately detecting an abnormality such as disconnection of the loop-signal line.

The fire receiver or the terminal device, which has detected an abnormality such as disconnection of the loop-signal line, immediately connects the first loop-signal line with the second loop-signal line to form a signal loop-back circuit. Even if the loop-back circuit is formed between the first loop-signal line and the second loop-signal line, the loop of the loop-signal line where no abnormality occurs remains secured, and on the other hand, the loop-signal line which undergoes an abnormality is connected to the loop-signal line which undergoes no abnormality by means of the loop-back circuit. Thus, not only signal transmission in the loop-signal line up to a point where an abnormality occurs is secured, but also signal transmission to the loop-signal line after the point which undergoes an abnormality is performed, thereby significantly raising the reliability of signal transmission.

What is claimed is:

1. A fire alarm system having a fire receiver to which a plurality of terminal devices are connected through loop-signal lines, said fire alarm system comprising:

a first loop-signal line connecting said fire receiver and said plurality of terminal devices in the form of a first loop and having a first signal transmission direction around said first loop; and a second loop-signal line connecting said fire receiver and said plurality of terminal devices in the form of a second loop and having a second signal transmission direction around said second loop which is opposite said first signal transmission direction around said first loop;

each of said fire receiver and said terminal devices comprising (a) a signal transmitting means for transmitting signals to said first and second loop-signal lines at the same time, (b) a first signal receiving means for receiving signals input from said first loop-signal line, (c) a second signal receiving means for receiving signals input from said second loop-signal line, and (d) a reception state determining means for determining whether a reception time difference between receiving of signals by said first signal receiving means and receiving of signals by said second signal receiving means is within a specified interval of time;

wherein, upon transmitting signals to said first and second loop-signal lines at the same time by said signal transmitting means of one of said fire receiver and said plurality of terminal devices, said first and second signal transmitting means and said reception state determining means of each of the remaining ones of said fire receiver and said plurality of terminal devices are operative to receive the signals input from the first and second loop-signal lines and to determine whether the time difference is within the specified interval of time.

2. A fire alarm system according to claim 1, wherein each of said fire receiver and said terminal devices further comprises:

(e) a loop-back connecting means for connecting said first loop-signal line with said second loop-signal line to form a signal loop-back path when said reception state determining means determines that said reception time difference is not within said specified interval of time;

(f) a loop-back cancelling means for cancelling said signal loop-back path formed by said loop-back connecting means when said reception state determining means determines that said reception time difference is within said specified interval of time; and (g) a signal processing means which outputs a signal to be transmitted to said signal transmitting means and which, when said first signal receiving means receives signals, processes the signals received by said first signal receiving means and when only said second signal receiving means receives signals, processes the signals received by said second signal receiving means.

3. A fire alarm system according to claim 2, wherein said loop-back connecting means comprises:

a first loop-back circuit which, when said reception state determining means determines that no signals are received by said first signal receiving means within said specified interval of time after said second signal receiving means receives signals, forms a transmission signal loop-back path from said second loop-signal line to said first loop-signal line; and a second loop-back circuit which, when said reception state determining means determines that no signals are received by said second signal receiving means within said specified interval of time after said first receiving means receives signals, forms a transmission signal loop-back path from said first loop-signal line to said second loop-signal line.

4. A fire alarm system according to claim 3, wherein said loop-back cancelling means includes means for cancelling the loop-back path formed by said first loop-back circuit when said reception state determining means determines that signals are received by said first signal receiving means after the loop-back path is formed by said first loop-back circuit, and for cancelling the loop-back path formed by said second loop-back circuit when said reception state determining means determines that signals are received by said second signal receiving means after the loop-back path is formed by said second loop-back circuit.

5. A fire alarm system according to claim 1, wherein each of said fire receiver and said terminal devices further comprises:

a first receiving terminal, which is connected to said first loop-signal line and said first signal receiving means, for receiving signals through said first loop-signal line;

a first transmitting terminal, which is connected to said first loop-signal line and said signal transmitting means, for transmitting signals to said first loop-signal line;

a first connecting/shut-down means for connecting said first receiving terminal with said first transmitting terminal and selectively shutting down the connection;

a second receiving terminal, which is connected to said second loop-signal line and said second signal receiving means, for receiving signals through said second loop-signal line;

a second transmitting terminal, which is connected to said second loop-signal line and said signal transmitting means, for transmitting signals to said second loop-signal line;

a second connecting/shut-down means for connecting said second receiving terminal with said second transmitting terminal and selectively shutting down the connection; and control means for shutting down the connection between said first receiving terminal and said first transmitting terminal and the connection between said second receiving terminal and said second transmitting terminal by means of said first and second connecting/shut-down means, respectively, when said signal transmitting means is transmitting signals.

6. A fire alarm system having a fire receiver to which a plurality of terminal devices are connected through loop-signal lines, said fire alarm system comprising:

a first loop-signal line connecting said fire receiver and said plurality of terminal devices in the form of a first loop and having a first signal transmission direction around said first loop; and a second loop-signal line connecting said fire receiver and said plurality of terminal devices in the form of a second loop and having a second signal transmission direction around said second loop which is opposite said first signal transmission direction around said first loop;

each of said fire receiver and said terminal devices comprising (a) a signal transmitting means for transmitting signals to said first and second loop-signal lines at the same time, (b) a first signal receiving means for receiving signals input from said first loop-signal line, (c) a second signal receiving means for receiving signals input from said second loop-signal line, (d) a reception state determining means for determining whether a reception time difference between receiving of signals by said first signal receiving means and receiving of signals by said second signal receiving means is within a specified interval of time, (e) a loop-back connecting means for connecting said first loop-signal line with said second loop-signal line to form a signal loop-back path when said reception state determining means determines said time difference is not within said specified interval of time, (f) a loop-back cancelling means for cancelling said signal loop-back path formed by said loop-back connecting means when said reception state determines that said reception time difference is within said specified interval of time, and (g) a signal processing means which outputs a signal to be transmitted to said signal transmitting means and which, when said first signal receiving means receives signals, processes the signals received by said first signal receiving means and when only said second signal receiving means receives signals, processes the signals received by said second signal receiving means;

wherein, upon an occurrence of an abnormality at a point of one of said first and second loop-signal lines, each of said fire receiver and said terminal devices located downstream of said point of said one of said first and second loop-signal lines forms a signal loop-back path using said loop-back connecting means thereof, and each of said fire receiver and said terminal devices located downstream of said point of said one of said first and second loop-signal lines other than the fire receiver or terminal device adjacent to the point cancels the signal loop-back path thereof using said loop-back cancelling means thereof, with only the signal loop-back path formed in the fire receiver or terminal device adjacent to said point being maintained.

* * * * *